(12) United States Patent
Buchholz et al.

(10) Patent No.: US 7,766,276 B2
(45) Date of Patent: Aug. 3, 2010

(54) AIRCRAFT FUSELAGE WITH UPPER AND LOWER DECK

(75) Inventors: Uwe Buchholz, Bliedersdorf (DE); Thomas Scherer, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 249 days.

(21) Appl. No.: 11/614,314

(22) Filed: Dec. 21, 2006

(65) Prior Publication Data

US 2007/0164158 A1    Jul. 19, 2007

(30) Foreign Application Priority Data

Dec. 21, 2005    (DE)    ........................ 10 2005 061 189

(51) Int. Cl.
*B64C 1/18* (2006.01)
(52) U.S. Cl. .................................................... 244/119
(58) Field of Classification Search ............. 244/117 R, 244/118.1, 118.5, 119, 129.1; 454/76, 77
See application file for complete search history.

(56) References Cited

U.S. PATENT DOCUMENTS

| | | | | |
|---|---|---|---|---|
| 2,641,985 A | * | 6/1953 | Jensen | 454/73 |
| 2,694,537 A | * | 11/1954 | Reichert | 244/118.5 |
| 2,925,050 A | * | 2/1960 | Candlin, Jr. et al. | 105/397 |
| 3,740,905 A | * | 6/1973 | Adams | 52/404.3 |
| 4,552,325 A | * | 11/1985 | Bruensicke | 244/118.5 |
| 4,646,993 A | * | 3/1987 | Baetke | 244/117 R |
| 4,819,548 A | * | 4/1989 | Horstman | 454/76 |
| 5,545,084 A | * | 8/1996 | Fischer et al. | 454/76 |
| 5,577,688 A | * | 11/1996 | Sloan | 244/117 R |
| 5,779,193 A | | 7/1998 | Sloan | |
| 5,890,957 A | * | 4/1999 | Scherer et al. | 454/76 |
| 5,897,079 A | * | 4/1999 | Specht et al. | 244/118.5 |
| 6,129,312 A | * | 10/2000 | Weber | 244/118.5 |

FOREIGN PATENT DOCUMENTS

| | | |
|---|---|---|
| EP | 0382604 | 8/1990 |
| EP | 0693423 | 1/1996 |
| EP | 0835803 | 4/1998 |

\* cited by examiner

*Primary Examiner*—Tien Dinh
(74) *Attorney, Agent, or Firm*—Wood, Herron & Evans, L.L.P.

(57) ABSTRACT

Aircraft fuselage with an upper deck, constructed as a passenger area, and a lower deck, including a freight area, and with a ventilation installation for the upper deck and lower deck, wherein a bilge area is constructed as a vacuum chamber against the freight area and is connected to the lower deck solely via flow orifices in the abutment area between a lower floor and the fuselage wall.

10 Claims, 1 Drawing Sheet

AIRCRAFT FUSELAGE WITH UPPER AND LOWER DECK

BACKGROUND

The invention relates to an aircraft fuselage, divided by an intermediate floor into an upper deck, preferably constructed as a passenger area, and a lower deck, constructed as a freight area, with a lower floor arranged in the lower deck, below which there is a bilge area, and with a ventilation installation with compressed air ducts through which fresh air can be fed into the upper deck which as exhaust air can be conducted from the upper deck via openings in the intermediate floor, preferably arranged in the area of the fuselage wall, into the lower deck and from there to the outside through one or more discharge valves.

The ventilation of the upper and lower decks to be carried out in an aircraft fuselage of the previously designated design is done under appreciable excess pressure compared with the ambient pressure and acts both as an air exchange and as heating. In typical aircraft fuselages there are large cross-sectional faces available for the cabin exhaust air in the lower floor areas. In spite of the drop in pressure on the flow path of the ventilation air, this results in low flow speeds in the lower deck. Because of the extremely low outside temperature in the largely predominating operating area of aircraft, appreciable temperature gradients occur owing to the lack of additional heating in the lower deck of aircraft, as a consequence of which considerable lifting forces act on the ventilation air. The flow speeds achieved in the openings in the intermediate floor owing to the drop in pressure or the pulse resulting therefrom are not sufficient, compared with the lifting forces, to avoid marked layer formation of cold and warm air in the lower deck. This may give rise to impermissibly cold areas in the lower deck.

SUMMARY OF THE INVENTION

The object of the present invention is to achieve as even a temperature distribution as possible in the lower deck of an aircraft fuselage and to utilize the heat energy contained in the ventilation air as far as possible to achieve a relatively high temperature level.

According to the invention the set object is achieved in that in an aircraft fuselage, the bilge area is sealed against the freight area to form a vacuum chamber, which is connected to the freight area solely via flow orifices of small cross-section in the abutment area between the lower floor and the fuselage wall.

The configuration according to the invention achieves the set object in that, because of the flow orifices of small cross-section in the area of the fuselage wall, a film flow is achieved tangentially over the fuselage wall from the intermediate floor to the bilge area. This film flow forms a very good insulation layer between the lower floor freight area and the fuselage wall. In this way it is achieved that the temperature in the lower floor freight area can heat up evenly to a level comparable to the temperature level in the passenger area. The loss of energy from the freight area is minimized.

In a preferred embodiment of the invention the flow orifices are formed in the abutment area between the lower floor and the fuselage wall by perforated sheets running in the longitudinal direction of the fuselage. In other words, the perforated sheets should advantageously be fixed between the rounded frames of the fuselage.

The use of perforated sheets and fixing them between the rounded frames is a solution requiring little outlay in terms of manufacturing technology, with which the desired flow path of the ventilation air can be produced.

A further preferred embodiment of the invention provides that the openings in the intermediate floor between the upper and lower decks are connected to flow ducts, wherein air flowing in the flow ducts is directed to be aligned tangentially to the fuselage wall. This construction supports the film flow along the fuselage wall in the lower deck.

DETAILED DESCRIPTION

Figure 1:
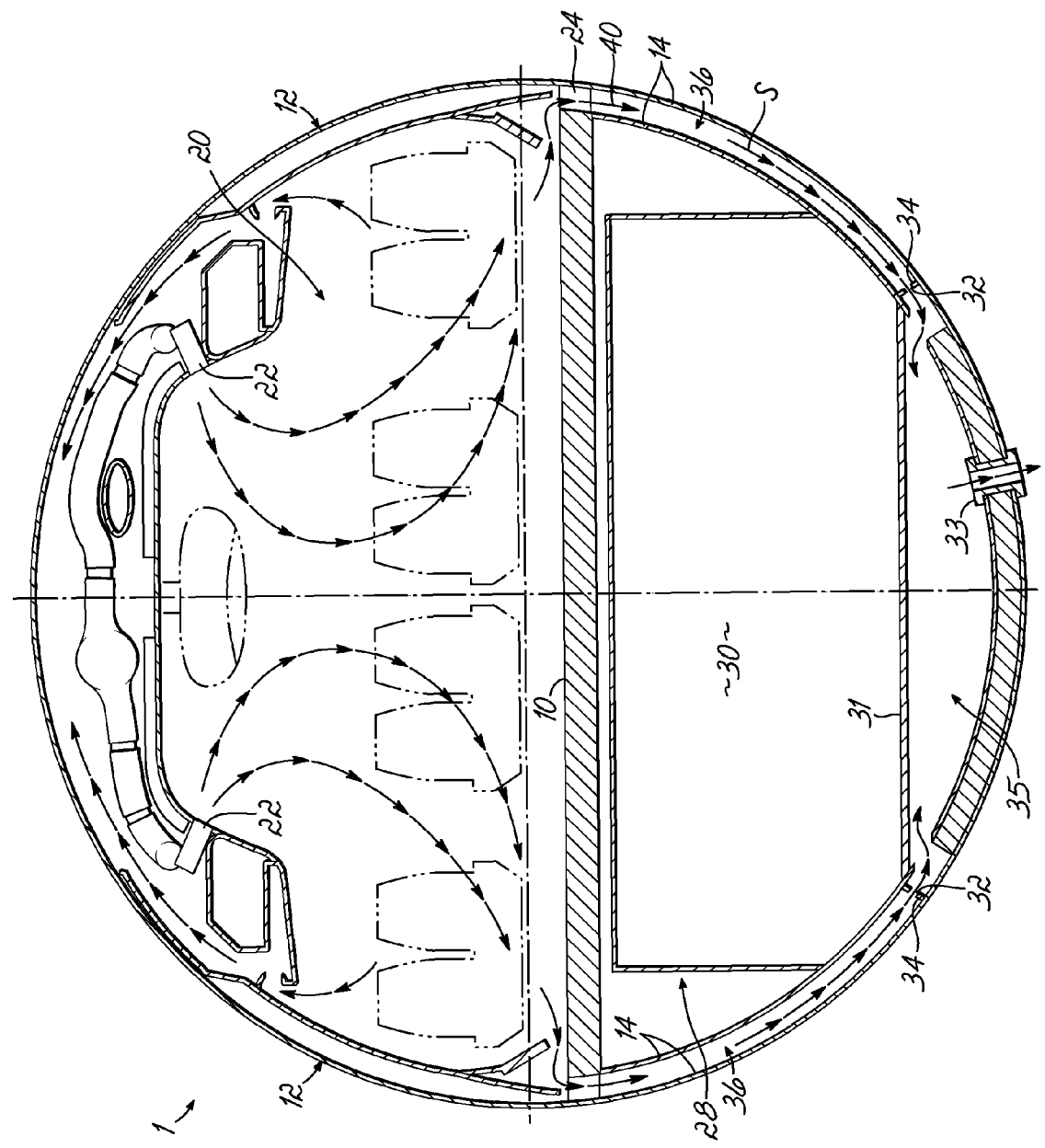
FIG. 1 illustrates an exemplary embodiment of an aircraft fuselage according to the invention.

FIG. 1 shows a schematic cross-section through an aircraft fuselage, designated in its entirety by 1. The fuselage 1 substantially has the shape of a hollow cylinder, which is divided by an intermediate floor 10 into an upper deck comprising a passenger area 20 and a lower deck 28. The lower deck 28 comprises a freight area 30 separated from a bilge area 35 by a lower floor 31. The lower floor 31 is intended to separate the bilge area 35 in a fluid-tight manner against the freight area 30. The fuselage wall 12 includes spaced-apart rounded frames 14 defining an abutment area, also referred to as a flow duct 36, as shown in FIG. 1. Flow orifices 32 of small cross-section are provided solely in the abutment area between the lower floor 31 and the fuselage wall 12 of the aircraft fuselage 1. These flow orifices 32 are constructed as perforated sheets 34 running in the longitudinal direction of the fuselage 1. In the area of the fuselage wall 12, openings 24 are arranged in the intermediate floor 10, which permit an air stream 40 out of the passenger area 20 into the lower deck 28.

The ventilation of the aircraft fuselage 1 is done in such a way that heated fresh air is blown into the passenger area 20 by compressed air ducts 22. This fresh air is conducted as exhaust air out of the passenger area 20 through the openings 24 into the lower deck 28. The construction of the openings 24 should be such that a tangential stream downwards along the fuselage wall 12 is achieved. As only the flow orifices 32 of the perforated sheets 34 are present in the lower deck 28 as a pressure sink, the ventilation air flowing into the lower deck 28 via the openings 24 forms a film flow S tangentially along the inner surface of the fuselage wall 12. In this way very good insulation of the freight area 30 against the fuselage wall 12 is achieved. The pressure sink along the flow orifices 32 of the perforated sheets 34 results because of the vacuum in the bilge area 35, which is achieved by discharge valves 33 from the bilge area 35 into the outside environment of the aircraft. It can be advantageous if the perforated sheets 34 are not formed by metal perforated sheets but by grid elements made of poor heat-conducting plastics material. Grid elements of this kind made of plastics material can also be fixed between the rounded frames 14 of the fuselage 1 with low constructional outlay.

LIST OF REFERENCE SYMBOLS

1 Aircraft fuselage
10 Intermediate floor
12 Fuselage wall
14 Rounded frame
20 Passenger area
22 Compressed air ducts
24 Openings in 10
28 Lower deck 30 Freight area
31 Lower floor
32 Flow orifices
33 Discharge valve
34 Perforated sheets
35 Bilge area
36 Flow duct
40 Air stream
S Film flow

The invention claimed is:

1. An aircraft fuselage, comprising:
a rounded frame including an exterior wall and an interior wall, with a peripheral flow passage located therebetween,
an intermediate floor dividing the aircraft fuselage into an upper deck comprising a passenger area and a lower deck comprising a freight area, that is positioned within the rounded frame,
a ventilation installation comprising compressed air ducts through which fresh air is supplied into the upper deck,
a lower floor arranged in the lower deck,
a bilge area located below the lower floor,
an abutment area disposed within the peripheral flow passage between the lower floor and the exterior wall,
a sheet located in the abutment area and having flow orifices extending therethrough, the flow orifices disposed in the peripheral flow passage at the abutment area, wherein fluid communication between the bilge area and the lower deck occurs solely via the flow orifices the sheet running in a longitudinal direction of the fuselage and arranged in the abutment area, and
at least one discharge valve disposed in the bilge area, wherein the discharge valve discharges air from the bilge area to the outside of the aircraft fuselage,
wherein a pressure in the bilge area is adjustable by operating the at least one discharge valve to be less than a pressure in the lower deck,
wherein an exhaust air stream is exhaustible from the upper deck through openings in the intermediate floor into the peripheral flow passage of the lower deck, from the peripheral flow passage downwardly along the exterior wall to the abutment area, through the flow orifices into the bilge area, and from the bilge area to the outside through the at least one discharge valve.

2. The aircraft fuselage of claim 1, wherein the flow orifices are formed by perforations in the sheet.

3. The aircraft fuselage of claim 1, wherein the shape of the exterior wall and the interior wall is such that air flowing in the peripheral flow passage flows tangentially along the exterior wall.

4. The aircraft fuselage of claim 1, wherein the intermediate floor is disposed below a widest cross-section of the aircraft fuselage such that the upper deck is larger than the lower deck.

5. The aircraft fuselage of claim 1, wherein the peripheral flow passage and the bilge area substantially surround the freight area of the lower deck, thereby to insulate the freight area from the environment outside of the aircraft fuselage.

6. An aircraft fuselage, comprising:
a cylindrical frame including an exterior wall and an interior wall spaced inwardly from the exterior wall and defining a peripheral flow passage therebetween;
an intermediate floor dividing the aircraft fuselage into an upper deck and a lower deck, the upper deck comprising a passenger area and the lower deck comprising a freight area, the upper deck being in fluid communication with the peripheral flow passage;
a ventilation installation comprising compressed air ducts through which fresh air is supplied into the upper deck;
a lower floor arranged in the lower deck;
a bilge area located below the lower floor, the bilge area being in fluid communication with the peripheral flow passage, and the peripheral flow passage terminating at the bilge area;
a sheet disposed in the peripheral flow passage adjacent the bilge area, the sheet having flow orifices extending therethrough, wherein fluid flow from the peripheral flow passage to the bilge area occurs solely via the flow orifices the sheet extending longitudinally along the fuselage and arranged adjacent to the bilge area; and
at least one discharge valve located within the bilge area, wherein the discharge valve discharges air from the bilge area to the outside of the aircraft fuselage, the at least one discharge valve operable to control fluid pressure in the bilge area,
wherein the fresh air supplied to the upper deck from the ventilator system is exhausted therefrom via the peripheral flow passage, downwardly along the exterior wall, through the flow orifices and into the bilge area, and to the outside through the at least one discharge valve.

7. The aircraft fuselage of claim 6, wherein the flow orifices are formed by perforations in the sheet, the perforated sheets being of relatively poor heat conducting capability.

8. The aircraft fuselage of claim 6 wherein lower portions of the interior wall which define the peripheral flow passage also define lower side walls for the freight area.

9. A method of warming an aircraft fuselage of the type recited in claim 6, comprising: flowing heated fresh air into the passenger cabin of the upper deck, the heated fresh air eventually flowing from the upper deck to the peripheral flow passage and then downwardly along the exterior wall into the bilge area.

10. The method of claim 9 further comprising:
operating the at least one discharge valve to adjust the fluid pressure within the bilge area, thereby to draw the heated fresh air from the passenger area to the bilge area via the peripheral flow passage and the flow orifices.

* * * * *